United States Patent
Touhsaent

(10) Patent No.: US 6,844,034 B2
(45) Date of Patent: Jan. 18, 2005

(54) PRINTABLE PLASTIC FILM WITH PRINTABLE COATING COMPRISING EPOXY ACRYLATE

(75) Inventor: Robert E. Touhsaent, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 272 days.

(21) Appl. No.: 09/828,638

(22) Filed: Apr. 6, 2001

(65) Prior Publication Data

US 2002/0146559 A1 Oct. 10, 2002

(51) Int. Cl.⁷ .......................... B41M 5/00; B41M 5/40; B32B 33/00; B32B 5/16; B32B 15/0426
(52) U.S. Cl. ............... 428/32.1; 428/32.21; 428/32.23; 428/32.26; 428/32.34; 428/32.38; 428/40.1; 428/219; 428/323; 428/413; 428/500; 428/515
(58) Field of Search .......................... 428/32.1, 32.21, 428/32.23, 32.26, 32.34, 32.38, 40.1, 219, 323, 343, 413, 500, 515, 41.5, 220, 332, 340, 341, 342, 353, 411.1

(56) References Cited

U.S. PATENT DOCUMENTS

| | | | |
|---|---|---|---|
| 3,705,076 A | 12/1972 | Usala | 161/89 |
| 4,214,039 A | 7/1980 | Steiner et al. | 428/414 |
| 4,214,409 A | 7/1980 | Gebhardt et al. | 52/127 |
| 4,632,869 A | 12/1986 | Park et al. | 428/315.5 |
| 5,073,448 A | 12/1991 | Vieira et al. | 428/331 |
| 5,194,324 A | 3/1993 | Poirier | 428/315.5 |
| 5,380,587 A | 1/1995 | Musclow et al. | 428/353 |
| 5,382,473 A | 1/1995 | Musclow et al. | 428/353 |
| 5,662,985 A | 9/1997 | Jensen et al. | 428/195 |
| 5,804,301 A * | 9/1998 | Curatolo | 428/352 |
| 5,883,193 A * | 3/1999 | Karim | 525/113 |
| 5,888,649 A | 3/1999 | Curatolo et al. | 428/352 |
| 6,025,059 A | 2/2000 | McGee et al. | 428/219 |
| 6,225,389 B1 * | 5/2001 | Saint Victor | 524/224 |
| 6,406,775 B1 * | 6/2002 | Houde | 428/195 |
| 2002/0098340 A1 | 7/2002 | Servante et al. | |

FOREIGN PATENT DOCUMENTS

| | | |
|---|---|---|
| EP | 0482838 | 3/1995 |
| EP | 0779326 | 12/1995 |
| ZA | 970523 | 1/1997 |

* cited by examiner

*Primary Examiner*—Sheeba Ahmed
(74) *Attorney, Agent, or Firm*—Rick James

(57) ABSTRACT

Printable, coated plastic substrates are disclosed. Plastic substrates are preferably films substrates, which are coated with a printable coating composition layer which comprises: an anionic acrylic polymer; and epoxy acrylate in an amount sufficient to improve ink adhesion in said coating composition. The anionic acrylic polymer can be cross-linked to an extent sufficient to improve the resistance of said coating to isopropyl alcohol and/or hot water, using a cross-linking agent.

26 Claims, No Drawings

PRINTABLE PLASTIC FILM WITH PRINTABLE COATING COMPRISING EPOXY ACRYLATE

FIELD OF THE INVENTION

The present invention relates to coated plastic substrates for printing applications, and more particularly to coated plastic films for printing applications.

BACKGROUND OF THE INVENTION

Typically, films prepared for use as label facestock are coated on the printing side with a coating, which enhances ink adhesion. For instance, U.S. Pat. No. 5,380,587 to Musclow et al. discloses a multilayer packaging or label stock film having excellent printability and non-blocking characteristics. The film is first primed and then coated with copolyester coating. Another ink adhesion enhancing coating is described in U.S. Pat. No. 5,382,473 to Musclow et al. which discloses a multilayer film structure with a prime coating which is the reaction product of acidified aminoethylated vinyl polymer and epoxy resin, top coated with polyester ink base to eliminate blocking. U.S. Pat. No. 5,662,985 to Jensen et al. discloses a two-side coated label which comprises a polymeric film substrate having on a first surface thereof (A) an adhesive anchor layer and on a second surface thereof (B) an ink base layer, the (A) and (B) layers being selected from the group consisting of: (i) a prime coating having on an external surface a functional coating of an interpolymer of (a) an alpha, beta-monoethylenically unsaturated carboxylic acid; and (b) a neutral monomer ester comprising an alkyl acrylate ester and an alkyl methacrylate ester; and (ii) an iminated polymer; or the (A) adhesive anchor layer being selected from the group consisting of: (iii) a mixture of the functional coating of (i) and the iminated polymer of (ii); (iv) a linear water dissipatable polyester condensation product; and (v) a polyester; or the (B) ink base layer being selected from the group consisting of: (vi) a prime coating having on an external surface a functional coating of an acrylic copolymer; and (vii) a prime coating having on an external surface a functional coating of a styrene copolymer, provided that each of the (A) adhesive anchor layer and the (B) ink base layer is different. U.S. Pat. No. 6,025,059 to McGee et al. discloses a plastic film coated with a printable epoxy coating which is the reaction product of a water-dispersible or -soluble epoxy resin, and an acidified aminoethylated vinyl polymer produced by polymerizing acrylate or other monomer, with methacrylic or acrylic acid. The acidified aminoethylated vinyl polymer is used as a hardener or curing agent. Republic of South Africa Patent Application 970523 (UCB) discloses a printable film coated with a layer containing water dispersible polymer and polyfunctional acrylates resulting from the esterification of a polyol (rather than epoxide) with (meth)acrylic acid or polyallyl derivatives.

The development of commercially acceptable coated plastic films for printing applications, e.g., printable labels, is often a compromise between a variety of desired properties. Labels used for beverage containers, or health and beauty containers, should be capable of exposure to severe conditions encountered during manufacturing, transport and storage. Thus printable coatings for plastic films should exhibit hot water resistance, organic solvent resistance, e.g., isopropyl alcohol resistance, abrasion resistance, and haze resistance on exposure to hot or cold water. At the same time, the coating should be receptive to ink so as to provide good adhesion of the ink to the coated film immediately after printing. The ink should stay adhered to the coated film after a label is made and applied to a beverage container that is exposed to hot or cold water and subsequent abrasion encountered in mechanized handling.

Non-crosslinked polymer constituents of coatings tend to increase in haze upon exposure to boiling water and may be completely soluble and removed upon exposure to isopropyl alcohol. In addition, after ink is applied and the label exposed to water and abrasion simulating a bottling line, the ink will abrade off the label. Coatings can be made resistant to hot water or chemicals by crosslinking polymers in the coating. However, when crosslinked, coatings are generally less receptive to inks, losing the ability to have good ink adhesion immediately after printing, especially at high printing speeds and low temperature.

It would be desirable to control crosslinking of polymers to obtain desirable water and chemical resistance properties while maintaining the ink adhesion and abrasion resistance associated with non-crosslinked polymers, as well as other properties that coated plastic films for printing applications should provide, including good graphics, ink gloss and short "tack up" times.

Accordingly, it is an object of the present invention to provide printable coated plastic films that comprise crosslinkable polymers which are cross-linked to an extent sufficient to provide boiling water resistance and isopropyl alcohol resistance while maintaining desirable ink adhesion properties.

SUMMARY OF THE INVENTION

In one aspect, the present invention relates to a printable plastic film, comprising: a plastic substrate layer; a printable coating composition layer which comprises: anionic acrylic polymer and epoxy acrylate in an amount sufficient to improve ink adhesion in said coating composition. The anionic acrylic polymer can be cross-linked to an extent sufficient to improve resistance of the coating to isopropyl alcohol and/or hot water using a cross-linking agent.

In another aspect, the present invention relates to a printable coating composition suitable for use in coating plastic film. The coating composition comprises: anionic acrylic polymer and epoxy acrylate in an amount sufficient to improve ink adhesion in said coating composition. The anionic acrylic polymer can be cross-linked to an extent sufficient to improve the resistance of said coating to isopropyl alcohol and/or hot water using a cross-linking agent.

The coated plastic film of the present invention is suitable for use as a label for articles, especially consumer packaging, e.g., bottles and jars, which require resistance to abrasion incurred during manufacture, transportation and handling. Such a label comprises a printable plastic film containing: i) a plastic substrate layer having two sides; ii) a printable coating composition layer on one side of said plastic substrate layer, which coating composition comprises: a) an anionic acrylic polymer; b) epoxy acrylate in an amount sufficient to improve ink adhesion in said coating composition; c) an optional cross-linking agent for said anionic acrylic polymer; and iii) an optional adhesive layer on the other side of said plastic substrate layer.

The coating of the present invention is suitable for receipt of an ink image. The ink print image can be positioned on the side of the coating opposite from the plastic substrate layer. The finished plastic film can have a dry coating weight of at least 0.1 grams/1000 in$^2$, with at least 0.3 grams/1000 in$^2$ being preferred, e.g., 0.3 grams to 0.6 grams/1000 in$^2$.

DETAILED DESCRIPTION OF THE INVENTION

Plastic Substrate

The plastic substrate to be coated can be any thermoplastic material. Preferably, the plastic substrate is produced from a thermoplastic material, such as polyolefins, polyamides, polyesters, and polyethylene terephthalate. Examples of polyolefins to be used include alpha-olefins produced by Ziegler-Natta or metallocene catalysts, such as polyethylene, polypropylene, and copolymers and terpolymers thereof.

Preferably, the plastic substrate layer is a film since thermoplastic films coated in accordance with the invention are particularly suitable for use as printable labels due to their excellent wet-scratch resistance, ink gross and print image. The films can be clear or cavitated structures, having one or several layers. Examples of film substrates particularly suitable for use are found in U.S. Pat. Nos. 5,382,473, 5,380,587 and 5,194,324, which are herein incorporated by reference. One preferred cavitated structure is a biaxially oriented cavitated polypropylene/polybutylene terephthalate film, disclosed in U.S. Pat. No. 4,632,869, which is herein incorporated by reference.

Total thickness of the printable plastic film of the present invention can range from 25 to 75 microns, with 35 to 55 microns being preferred. Cavitated (or opaque) film substrates can have a thickness from 50 to 250 microns, with 60 to 100 microns being preferred. The plastic substrate layer can comprise 60 to 99.9% by weight of the printable plastic film, preferably 80 to 99.5%, more preferably 90 to 99%. The coating composition can comprise 40 to 0.1% by weight of the printable plastic film, preferably 20 to 0.5%, more preferably 10 to 99%. Additional layers such as optional primer layer or tie layer can comprise 0.01 to 10% by weight of the printable plastic film, preferably 0.05 to 5%, more preferably 0.1 to 2%.

Printable Coating Composition

Base Resin Anionic Acrylic Polymer

The base resin employed is an anionic acrylic polymer, i.e., an acrylic polymer with acid functionality such as a polymer containing acrylic acid or methacrylic acid. Generally, such anionic acrylic polymers exhibit an acid functionality on polymerization of no greater than about 10%.

Particularly preferred anionic acrylic polymers are iminated polymers. In a preferred embodiment of the invention the anionic acrylate polymer is an iminated interpolymer of methyl methacrylate, $C_2$ to $C_8$ alkyl methacrylates and/or $C_1$ to $C_{12}$ alkyl acrylates, with an ethylenically unsaturated carboxylic acid.

The iminated polymer can contain an acrylic polymer of methyl methacrylate, an alkyl acrylate or an alkyl methacrylate and an ethylenically unsaturated carboxylic acid that is reacted with an alkylene imine such as ethylene imine, or propylene imine. More specifically, it comprises a polymer of (1) methyl methacrylate, (2) alkyl methacrylate having 2 to 12, specifically 2 to 8 carbon, atoms in the alkyl group or an alkyl acrylate having 1 to 12, specifically 2 to 8 carbon atoms in the alkyl group, and (3) an ethylenically unsaturated carboxylic acid that is reacted with an alkylene imine. Typically, this acrylic polymer is prepared by conventional solution, emulsion or bulk polymerization techniques in which the monomer, polymerization catalyst and solvents are charged into a polymerization vessel and heated to form a polymer of the desired molecular weight of the polymer and subsequently reacted with an alkylene imine. One method for preparing these acrylic polymers is provided in U.S. Pat. No. 3,705,076, incorporated herein by reference.

Examples of typical alkyl groups of the alkyl methacrylate include: ethyl, propyl, isopropyl, butyl, tert-butyl, hexylmethyl, 2-ethylhexyl, octyl and the like.

Examples of typical alkyl groups of the alkyl acrylates include: ethyl, propyl, butyl, isobutyl, propyl, hexyl, 2-ethylhexyl, octyl, nonyl, decyl, lauryl and the like.

Examples of typical ethylenically unsaturated acids include methacrylic acid, ethylacrylic acid, acrylic acid, itaconic acid and the like.

Any of the alkylene imines mentioned in U.S. Pat. No. 3,705,076 can be used to iminate the acrylic polymers. Specific examples include ethylene imine and propylene imine, which, typically, are used in amounts of about 4 to 6% by weight of the acrylic polymer. Polyfunctional aziridine compounds can also be used.

A typical acrylic polymer of this invention is (1) 70 to 90% by weight methyl methacrylate, (2) 9 to 19% by weight of the $C_2$ to $C_{12}$ alkyl acrylate, and (3) 1 to 11% by weight of either acrylic acid or methacrylic acid, and is reacted with about 1 to 8% by weight of an alkylene imine. Another typical acrylic polymer of this invention is (1) 78 to 82% by weight of methyl methacrylate, (2) 9 to 17% by weight of ethyl acrylate, (3) 5 to 9% by weight of methacrylic acid and is reacted with about 4 to 6% by weight of alkylene imine. Still another typical acrylic polymer consists essentially of methyl methacrylate/ethyl acrylate/methacrylic acid in a weight ratio of 80/13/7 and is reacted with 4 to 5% by weight of propylene imine.

Iminated polymers are commercially available from Zeneca Resins under the product designation "NeoCryl" such as "NeoCryl XK-90" and "NeoCryl XA-5090".

Cross-linking of Anionic Acrylic Polymer

The anionic acrylic polymer can be cross-linked with a cross-linking agent to improve solvent resistance of the coating. If the anionic acrylic polymer has functional groups to self-crosslink or inherently has isopropyl and/or boiling water resistance adding crosslinking agent can be omitted. For present purposes, isopropyl alcohol resistance and/or hot water resistance can measure solvent resistance. Measurement of isopropyl alcohol resistance of the coated plastic film of the present invention can be carried out by rubbing an isopropyl alcohol soaked swab about 4 by 4.5 centimeters available from Becton-Dickinson in a circular motion 12 times on a coated surface with medium pressure using the index finger. The resulting loss of coating is rated as follows: 0=no effect, 1=lightly scratched, 2=some whitening (or surface of coating removed), 3=some rubbed off (down to base film), 4=about 50% rubbed off (down to base film), and 5=100% rubbed off. For present purposes, products having a rating of less than 2 are preferred.

Measurement of hot water resistance of the coated plastic film of the present invention can be carried out by boiling the coated film for ten minutes in water and thereafter measuring for % haze in accordance with the protocol set out in ASTM D1003. For present purposes, products having a boiling water haze of 6% or less are preferred and less than 3 are especially preferred.

Cross-linking is carried out to the extent necessary to provide at least some observable improvement in the solvent resistance properties as measured above. The extent of cross-linking can be controlled by the amount of cross-linking agent and catalyst added to the anionic acrylic polymer. Crosslinking should generally be accomplished in three weeks and room temperature. Higher temperature can be used to simulate shipping temperature or long term aging. Heat aging film to increase crosslinking as a step in the process is avoided if possible.

The cross-linking agent can be selected from the group consisting of polyfunctional aziridine, epoxy silane, polyfunctional epoxy, polyvalent cation selected from the group of metal ions consisting of Zr, Zn, Ca, and Ti, acetoacetate, carbodiimide, polyfunctional isocyanate, urea formaldehyde and melamine formaldehyde. Preferably, the cross-linking agent is selected from the group consisting of epoxy silane, polyfunctional epoxy, and melamine formaldehyde.

In some circumstances, the cross-linking agent is added with a cross-linking catalyst. Such catalysts are known to those skilled in the art. Amine catalysts are preferred for epoxy crosslinking agents, preferably DMP-30 or imidazoles. Acid catalysts are preferred for formaldehyde resins, preferably p-toluene sulfonic acid.

The weight ratio of cross-linking agent: anionic acrylic polymer can range from about 0.5:100 to 10:100, preferably 1:100 to 5:100, more preferably 1:100 to 3:100. The weight ratio of catalyst: cross-linking agent can range from about 0.1:100 to 10:100, preferably 0.5:100 to 5:100, more preferably 1:100 to 3:100.

Epoxy Acrylate Component

Despite the advantage in solvent resistance attributable to cross-linking, a deleterious effect associated with cross-linking may exist. In particular, cross-linking can cause a reduction in ink adhesion which may render a coated plastic film unfit for its intended use. Accordingly, the present invention is especially advantageous where the anionic acrylic polymer is cross-linked inasmuch as it provides an additional component to counteract unwanted effects of cross-linking by improving ink adhesion properties of the coated plastic film. The presence of epoxy acrylate component can improve ink adhesion inasmuch as it adds reactive acrylic double bonds to the coating composition, which can react with double bonds in inks, especially those contained in UV curable inks or lithographic inks. Epoxy acrylate can also function to make the ink penetrate the coating faster or to a greater extent.

Ink adhesion can be measured within ten minutes of applying ink to the coated plastic film, which has been aged until crosslinking is nearly complete, usually one to three weeks at ambient temperature or a shorter at higher temperature. The ink is scored by an instrument comprising 4 blades arranged to cut a cross-hatched pattern down to the substrate layer after perpendicular cuts. The ink on the surface of the coated film is then picked off using three rapid pulls of 610 Scotch tape available from 3M of Minneapolis, Minn. Ink adhesion is then estimated as a percentage of print remaining. For purposes of the present invention, ink adhesion of greater than 95% is acceptable, with 99% or greater being preferred.

The epoxy acrylate used in the coating of the present invention can be made by addition of unsaturated acid, such as acrylic acid, to mono, di and/or poly epoxy compounds. Preferably the epoxy acrylate compounds can be the reaction product of an ether containing a three member oxirane ring, e.g., a glycidyl ether, of a member selected from the group consisting of phenols, bisphenols, ring substituted bisphenols, resorcinol, hydroquinone, adipic acid, phthalic acid, hexahydrophthalic acid, 2-hydroxy-3-chloropropyl acrylate, allyl alcohol, phenol, 1,6-hexanediol, glycerol, phenol formaldehyde novolac resins, polyethylene glycol, polypropylene glycol, ethylene glycol, propylene glycol, 1–4 butanediol, 1–6 hexanediol glycerol, glycol, lower alkyl substituted hydantoin and mixtures thereof; and an unsaturated acid selected from the group consisting of acrylic acid and methacrylic acid, diacrylic acid, dimethylacrylic acid, triacrylic acid and trimethylacrylic acid. Epoxy acrylate which is the reaction product of a glycidyl ether of a member selected from the group consisting of polyethylene glycol and polypropylene glycol; and an unsaturated acid selected from the group consisting of acrylic acid and methacrylic acid, is preferred. Especially preferred is the reaction product of a glycidyl ether polypropylene glycol; and an unsaturated acid, which is acrylic acid. The molar ratio of epoxy groups to unsaturated acid is preferably 1 or close to 1.

Suitable epoxy acrylates are available from Nagase Chemicals, Ltd., Tatsuno City, Hyogo, Japan under the tradename "Denacol Acrylate" UV or EB Curable Resin. Specific products include "DM-811" (epoxy methacrylate from (poly)ethylene glycol); "DA-911" (epoxy acrylate from (poly)propylene glycol); and "DA-911M" (epoxy acrylate from (poly)propylene glycol);

Under conditions where the epoxy acrylate may self-react, e.g., long storage periods or high storage temperatures, it is advisable to stabilize the epoxy acrylate by the incorporation of a suitable stabilizer, e.g., one selected from the group consisting of methyl ether of hydroquinone, and hydroquinone with methyl ether of hydroquinone being preferred.

Additional Coating Additives

Anti-block/Coefficient of Friction Reducing Particles for Clear Film

In a preferred embodiment, the coating can have dispersed throughout, an anti-block/coefficient of friction reducing particulate having a particle size greater than the thickness of the coating layer. Typically, the anti-block/coefficient of friction reducing particulate has a particle size greater than 1 micron. Examples of anti-abrasive particulate include, but are not limited to, silica, talc, clay, surface modified clay, surface modified silica, surface modified $TiO_2$, crosslinked acrylic, silicon and mixtures thereof. One particular preferred anti-abrasive particulate is crosslinked acrylic. The anti-abrasive particulate is added per 100 parts binder at maximum level of about 3 phr to keep haze low, with about 0.3 phr being preferred, and about 0.1 phr being more preferred.

Anti-abrasive Particulates

In a preferred embodiment, the coating can have dispersed throughout, an anti-abrasive particulate having a particle size greater than the thickness of the coating layer. Typically, the anti-abrasive particulate has a particle size greater than 1 micron. Examples of anti-abrasive particulate include, but are not limited to, silica, talc, clay, surface modified clay, surface modified silica, surface modified $TiO_2$, crosslinked acrylic, silicon and mixtures thereof. One particular preferred anti-abrasive particulate is crosslinked acrylic. The anti-abrasive particulate is added per 100 parts binder at minimum level of about 1 phr, with about 3 phr being preferred, and about 5 phr being more preferred. Maximum levels of anti-abrasive particulate per 100 parts binder should not exceed more than about 30 phr, with no more than about 15 phr being preferred and no more than about 10 phr being more preferred. Increasing amounts of the anti-abrasive particulate have been found to provide increased wet-scratch resistance, with a plateau effect occurring around 30 phr per 100 parts binder.

Particles to Improve Ink Adhesion

In another preferred embodiment, the coating can have dispersed throughout, a small particulate filler having a particle size less than 1 micron to improve printability and for clear coating less than 0.05 microns are preferred. Examples of small particulate filler include, but are not limited to, colloidal silica, colloidal alumina, surface modified clay, surface modified silica, surface modified $TiO_2$ and mixtures thereof.

Anti-static Additives

The coating can further contain antistatic additives, which are known to those skilled in the art. A preferred anti-static additive package is non-ionic surfactant combined with choline chloride.

Wetting Aids

The coating composition can also contain various wetting aids and secondary curing agents. For example, the coating composition when applied to the substrate layer may not "wet-out" uniformly, especially when such materials are applied in very thin layers. As a result, the dry but as yet uncured liquid mixture may retract into droplets or "islands."

To improve the "wet-out" of the coating or to disperse particulates, small amounts of wetting aid from 0.2% up to about 10% by weight of the total solids can be used. Any conventional non-ionic wetting agents can be employed. Water-soluble solvents like the ethyl ether of ethylene glycol or the methyl ether of propylene glycol can be employed, especially when using hydrophobic pigments. However, optimum results are generally obtained utilizing relatively high boiling point, i.e., above 100° C., partially water-soluble organic compounds having hydrophilic groups attached to hydrophobic groups. Examples of such compounds include, but are not limited to, the hexyl or benzyl ether of ethylene glycol, the hexyl ether of diethyl glycol, butyl alcohol, hexyl alcohol, octyl alcohol, diacetone alcohol, and the like. One such preferred wetting aid is the hexyl ether of diethyl glycol also known as Hexyl Cellosolve, which is commercially available from Union Carbide.

Filler Materials

In order to attenuate the surface gloss of the coated substrate to provide a satin to matte-like finish, a filler material having a small particle size is generally used in addition to the anti-abrasive particulate described above. The small particulate filler provides a matte-like finish to the coating, which is clear when unfilled, or contains the anti-abrasive particulate only. The small particulate filler allows for greater particle densities per square inch of coating thereby producing greater opacity and reduced gloss on clear and cavitated film substrates. The small particulate filler has a particle size less than 1 micron, with less than 0.8 microns being more preferred. However, particles less than 0.05 microns are not preferred since they will have a minimal effect on opacity and gloss. Alternatively, the small particulate filler, in large quantities, can be used with, or in lieu of, the anti-abrasive particulate since the filler, unless ultra pure, will generally contain a population of particles having a particle size greater than 1 micron.

The actual amount of filler material to be incorporated into the coating is variable, with the specific finish of the coating being directly dependent on the amount and type of filler material used. One skilled in the art can easily ascertain all of these parameters.

The small particulate filler is added per 100 parts coating, at minimum levels of about 50 phr, with about 75 phr being preferred, and about 90 phr being more preferred. Maximum levels of small particulate filler material per 100 parts binder should not exceed more than about 300 phr, with no more than about 250 phr being preferred, and no more than about 160 phr being more preferred.

The anti-abrasive particulate and the small particulate filler can be any conventional filler material used in printing applications. Examples of such materials include, but are not limited to, silica, clays, zinc oxide, tin oxide, talc, Tospearl™, surface modified clays, surface modified silicas and surface modified titanium dioxide ($TiO_2$). The filler materials are classified into two functional groups: hydrophilic fillers and hydrophobic fillers.

The hydrophilic fillers include silicas, clays, zinc oxide, tin oxide and talc. They are referred to as hydrophilic due to the ability to absorb water, which is measured by pore volume or porosity. The hydrophilic filler materials preferably have a low porosity or are non-porous. In the context of the present invention, low porosity means a porosity less than 3 milliliters/gram (ml/g), with less than 1.5 ml/g being preferred and less than 0.5 ml/g being more preferred. Low porosity and non-porous fillers have been found to provide the coated substrate with better overall properties than their more porous counterparts. A preferred low porosity filler is silica since it can be obtained in various grades of porosity and particle size, which makes it particularly suitable as anti-abrasive particulate. Examples of commercially available low porosity silicas are silica gels manufactured by Fuji Sylysia Chemical Company, under the tradename Sylysia™ and silica gels manufactured by Grace-Davison, under the tradenames Sylojet™, and Syloid™.

The hydrophobic fillers include the surface modified clays, surface modified silicas and surface modified $TiO_2$, which have been rendered non-porous to water due to their surface modification with an organic moiety. Examples of surface modified clays include surface modified kaolinite clays sold under the tradename Kalophile-2™ by Dry Branch Kaolin and Lithoperse™7015 HS and 7005CS by Huber Engineered Minerals, and Kaopolite SFO from Kaopolite, Inc., which is no longer in production. A surface modified silica is AeroSil RX50 manufactured by Aerosil Nippon, located in Japan.

In accordance with the present invention, hydrophobic fillers are preferred since they allow for excellent wet-scratch resistance while providing excellent ink gloss and graphics. Hydrophobic fillers also appear to counter the detrimental effect that antistatic additives (e.g., a combination of nonionic surfactant like Triton X405 and a salt such as lithium chloride or choline chloride) have on wet-scratch resistance exhibited by the unfilled coatings and the coatings containing hydrophilic filler only. Combinations of the hydrophobic and hydrophilic can also be used, and are even more preferred, since they further increase wet-scratch resistance. In fact, combinations of the two functional types of material (e.g., low porosity silica as the anti-abrasive at 10 parts per 100 parts binder, surface modified clay as the small particulate at 100 parts per 100 parts binder, and an antistatic additive at 9 parts per 100 parts binder) have resulted in printable films exhibiting good gloss and graphics.

Application of Coating

The coating, filled or unfilled, is applied utilizing a standard coating technique to one or both sides of the substrate after the substrate has been treated to enhance adhesion by means well known in the art, typically by corona treatment. An example of a coating process is gravure coating. The filled or unfilled coating can also be applied to the non-print surface of the substrate since it is usually more convenient to coat both sides, especially if the substrate is a film. In fact, coating of the non-print surface is preferred since it improves sheeting and print operations. However, for economic reasons, the coating on the non-print surface can also be thinner than the coating on the print surface.

The coating is applied to the substrate at a dry coating weight of at least 0.1 grams/1000 in (g/msi). More preferable, a minimum coating weight of at least 0.3, e.g., 0.3 to 0.6 g/msi is applied. The coated substrate is subsequently passed through a hot air oven to remove the water and solvent present. Residence times from 1 to about 10 seconds in the oven between 200°–250° F. are usually sufficient.

In an alternative embodiment, the anti-abrasive particulate is applied to the coating as a topcoat instead of being incorporated in the coating. For example, the particulate is dispersed in a suitable carrier, e.g., Tospearl™ in water with a surfactant, and applied to the coated substrate by conventional coating techniques. The ink print image is then applied to the topcoat instead of the coating.

Adhesive and Anti-static Components

In order to provide printable labels, the non-print surface of the coated plastic substrate (i.e., the surface of the substrate opposite the coating) can be coated with various adhesives and have a releasable liner adhered thereon, or with antistatic coatings to improve application performance of coated substrates.

Primer Layer

In another alternative embodiment of the present invention, a primer or functional layer can be applied to the coating side of the plastic substrate prior to coating. Examples of the primer for thermoplastic materials include poly(ethyleneimine), which can be coextruded with or coated on the plastic substrate, and the epoxy coating at a low coating weight following the teaching of U.S. Pat. No. 4,214,409 to Steiner et al. Corona, plasma or flame treating can also be used with or instead of the primer. Functional layers can provide a barrier to gas and water vapor transmission. Materials to be used as the functional layer include, but are not limited to, poly(vinyl alcohol) and polyvinylidene chloride.

Coating on Side Opposite of the Printable Layer

Coating may optionally be applied on the side opposite side of the substrate film from the printable layer to improve the adhesion of pressure sensitive adhesives or to improve blocking, etc.

Printing

The ink print image can be applied to the coated substrate using any known printing process. Examples include, but are not limited to, lithographic, UV-screen and intaglio printing processes. Similarly, the choice of inks to be used is variable.

The following non-limiting examples illustrate advantageous use of the above described coating for printable plastic films.

EXAMPLE 1
(Comparative—No Cross-linking Agent and No Epoxy Acrylate)

A coating composition was prepared by combining 66.67 g of anionic acrylic polymer (NeoCryl XK-90 resin available from Zeneca Resins of Wilmington, Mass., USA) with 133 g of water and 2.5 g of 10% Epostar MA1006, a cross-linked acrylic particulate dispersed at 10% solids. Epostar MA 1006 is an anti-block/coefficient of friction reducing additive made from methyl methacrylate resin having an average diameter of about 6 microns and is commercially available from Nippon Shokubai. The ingredients were added in the order listed and stirred for at least 30 minutes at ambient temperature.

A 50 foot long sample of 6 inch wide plastic substrate film (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the polyethylene skin then top coated at 250° F., at 30 feet per minute, using a 135 Quad Direct Gravure, and 15% solids top coating. The resulting coated plastic film showed a poor isopropyl alcohol (IPA) resistance rating of 5 after 44 hours of aging at 150° F. with nearly 100% rubbed off. Hot water resistance of the coated plastic film was determined by boiling the coated film aged 3 weeks at ambient temperature for ten minutes in water and thereafter measuring haze at 6.8% in accordance with ASTM D1003, indicating an unsatisfactory rating. Crosshatch Ink Adhesion immediately after printing with Black UV Screen Ink after such aging of the coated film showed excellent adhesion (100%) after three tape pulls. Without cross-linking, boiling water resistance and IPA resistance are poor.

EXAMPLE 2
(Comparative—Epoxy Silane Cross-linking Agent and Catalyst, No Epoxy Acrylate)

A coating composition was prepared by combining 62.60 g of anionic acrylic polymer (NeoCryl XK-90 resin) with 132 g of water, 2.5 g of 10% MA1006, 1.41 g of cross-linking agent (A-187 epoxy silane obtained from OSi Specialties of Endicott N.Y.) with 4.23 g (10%) of imidazole as a catalyst for cross-linking. The ingredients were added in the order listed and stirred for at least 30 minutes at ambient temperature.

A 50 foot long sample of 6 inch wide plastic substrate (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side skin then top coated at 250° F., at 30 feet per minute, using a 135 Quad Direct Gravure, and 15% top coating. The resulting coated plastic film showed improved isopropyl alcohol (IPA) resistance rating of 2.5 after 44 hours of aging at 150° F. (50% whitening, none completely rubbed off). Hot water resistance of the coated plastic film after three weeks ambient aging was determined by boiling the coated film for ten minutes in water and thereafter measuring haze at 2.2% in accordance with ASTM D1003, indicating a satisfactory rating. On the other hand, Crosshatch Ink Adhesion immediately after printing with Black UV Screen Ink after such aging of the coated film showed significantly reduced adhesion (20%) after three tape pulls. Boiling water resistance and IPA resistance are improved with crosslinking but ink adhesion is poor.

EXAMPLE 3
(Comparative—Polyfunctional Aziridine Cross-linking Agent, No Epoxy Acrylate)

A coating composition was prepared by combining 66.0 g of anionic acrylic polymer (NeoCryl XK-90 resin) with 134 g of water, 2.5 g of 10% MA1006, and 1.41 g of cross-linking agent (XAMA-7, a polyfunctional aziridine obtained from Sybron Chemicals Inc. of Birmingham, N.J. The ingredients were added in the order listed and stirred for at least 30 minutes at ambient temperature. A 50 foot long sample of 6 inch wide plastic substrate (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side then top coated at 250° F., at 30 feet per minute, using a 135 Quad Direct Gravure, and 15% top coating. The resulting coated plastic film showed a similar isopropyl alcohol (IPA) resistance rating of 2.9 after 44 hours of aging at 150° F. (surface whitened, 90% abraded but not rubbed off down to substrate). Hot water resistance of the coated plastic film aged 3 weeks at ambient temperature was determined by boiling the coated film for ten minutes in water and thereafter measuring haze at 3.3% in accordance with ASTM D1003. Crosshatch Ink Adhesion, immediately after printing with Black UV Screen Ink after 44 hours of aging the coated film at 150° F., showed somewhat improved but still poor black UV ink adhesion (55%) after three tape pulls. Boiling water resistance and IPA resistance are improved with crosslinking but ink adhesion is poor, although improved with polyfunctional aziridine.

EXAMPLE 4
(Epoxy Acrylate, No Cross-linking Agent)

A coating composition was prepared by combining 63 g of anionic acrylic polymer (NeoCryl XK-90 resin) with 135 g of water, 2.5 g of 10% MA1006, and 1.7 g of epoxy acrylate (DA-911M, epoxy acrylate from polypropylene glycol, i.e., $CH_2=CHCOO—CH_2CH(OH)CH_2—(OCH(CH_3)CH_2)_n—OCH_2CHOHCH_2—OCOCH=CH_2$, where n is at least 1, obtained from Nagase Chemicals, Ltd., Tatsuno City, Hyogo, Japan). The ingredients were added in the order listed and stirred for at least 30 minutes at ambient temperature. A 50 foot long sample of 6 inch wide plastic substrate (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side then top coated at 250° F., at 30 feet per minute, using a 135 Quad Direct Gravure, and 15% top coating. The resulting coated plastic film showed an isopropyl alcohol (IPA) resistance rating of 3.1 after 44 hours of aging at 150° F. (surface of coating abraded and 5% completely rubbed off to substrate). Hot water resistance of the coated plastic film aged for three weeks at ambient temperature was determined by boiling the coated film for ten minutes in water and thereafter measuring haze at 13.6% in accordance with ASTM D1003. Crosshatch Ink Adhesion immediately after printing with Black UV Screen Ink after such aging of the coated film showed excellent adhesion (100%) after three tape pulls. Epoxy acrylate alone does not improve boiling water resistance or IPA resistance of a coating resin inherently without boiling water resistance or IPA resistance to acceptable levels.

EXAMPLE 5
(Epoxy Acrylate, Epoxy Silane Cross-linking Agent and Catalyst)

A coating composition was prepared by combining 59 g of anionic acrylic polymer (NeoCryl XK-90 resin) with 134 g of water, 2.5 g of 10% MA1006, 1.33 g of cross-linking agent (A-187 epoxy silane) with 4.0 g (10%) of imidazole curing agent as a catalyst for cross-linking and 1.6 g of epoxy acrylate (DA-911M). The ingredients were added in the order listed and stirred for at least 30 minutes at ambient temperature.

A 50 foot long sample of 6 inch wide plastic substrate (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable skin then top coated at 250° F., at 30 feet per minute, using a 135 Quad Direct Gravure, and 15% top coating. The resulting coated plastic film showed an isopropyl alcohol (IPA) resistance rating of 2.6 after 44 hours of aging at 150° F. (60% of surface abraded, no spots where coating is completely removed). Hot water resistance of the coated plastic film was determined by boiling the coated film after aging for three weeks at ambient temperature for ten minutes in water and thereafter measuring haze at 3.1% in accordance with ASTM D1003. Crosshatch Ink Adhesion immediately after printing with Black UV Screen Ink after 44 hours of aging the coated film at 150° F. showed improved adhesion (70%) after three tape pulls. The use of epoxy acrylate with crosslinking improves results.

EXAMPLE 6
(Epoxy Acrylate, Epoxy Silane Cross-linking Agent and Catalyst With Colloidal Silica)

A coating composition was prepared by combining 48.5 g of anionic acrylic polymer (NeoCryl XK-90 resin) with 132 g of water, 13.64 g of colloidal silica (Ludox AS40 obtained from DuPont), 2.5 g of 10% MA1006, 3.27 g of crosslinking agent (A-187 epoxy silane) with 3.27 g (10%) of imidazole curing agent as a catalyst for cross-linking, and 1.31 g of epoxy acrylate (DA-911M). The ingredients were added in the order listed and stirred for at least 30 minutes at ambient temperature.

A 50 foot long sample of 6 inch wide plastic substrate (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side then top coated at 250° F., at 30 feet per minute, using a 135 Quad Gravure, and 15% top coating. The resulting coated plastic film showed an isopropyl alcohol (IPA) resistance rating of 2.5 after 44 hours of aging at 150° F. Hot water resistance of the coated plastic film was determined by boiling the coated film after aging for three weeks at ambient temperature for ten minutes in water and thereafter measuring haze at 2.1% in accordance with ASTM D1003. Crosshatch Ink Adhesion immediately after printing with Black UV Screen Ink after 44 hours of aging the coated film at 150° F. showed excellent adhesion (100%) after three tape pulls. The use of colloidal silica improved results with epoxy silane crosslinking agent.

EXAMPLE 7
(Epoxy Acrylate, Polyfunctional Aziridine Cross-linking Agent)

A coating composition was prepared by combining 62.3 g of anionic acrylic polymer (NeoCryl XK-90 resin) with 136 g of water, 2.5 g of 10% MA1006, 0.28 g of cross-linking agent (XAMA-7, a polyfunctional aziridine) and 1.7 g of epoxy acrylate (DA-911M). The ingredients were added in the order listed and stirred for at least 30 minutes at ambient temperature.

A 50 foot long sample of 6 inch wide plastic substrate film (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side then top coated at 250° F., at 30 feet per minute, using a 135 Quad Direct Gravure, and 15% top coating. The resulting coated plastic film showed an isopropyl alcohol (IPA) resistance rating of 2.2 after 44 hours of aging at 150° F. (20% whitening, none rubbed completely off). Hot water resistance of the coated plastic film was determined by boiling the coated film after aging 3 weeks at ambient temperature for ten minutes in water and thereafter measuring haze at 2.0% in accordance with ASTM D1003. Crosshatch Ink Adhesion immediately after printing with Black UV Screen Ink after such aging of the coated film showed excellent adhesion (100%) after three tape pulls. Using polyfunctional aziridine as the crosslinker with epoxy acrylate gives a good combination of boiling water resistance, IPA resistance and excellent ink adhesion.

EXAMPLE 8
(Epoxy Acrylate, Methyl Ether of Hydroquinone Stabilizer for Epoxy Acrylate, Polyfunctional Aziridine Cross-linking Agent)

The coating formulation of the present invention was revised by increasing amounts of crosslinker and epoxy acrylate to improve IPA resistance, while adding methyl ether of hydroquinone (MEHQ) as a stabilizer for the epoxy acrylate for the purpose of improving ink adhesion.

A coating composition was prepared by combining 5192 g of anionic acrylic polymer (NeoCryl XK-90 resin) with 12288 g of water, dilute ammonium hydroxide in an amount to adjust the pH to 8.0, 140 g of MA1006 (dispersed at 5% solids) (0.3 parts per hundred based on acrylic polymer), 23.4 g of methyl ether of hydroquinone (MEHQ), 1% in water (0.01 phr), 29 g of cross-linking agent (NeoRez CX100, a polyfunctional aziridine, available from Zeneca Resins) (1.25 phr), and 327 g of epoxy acrylate (DA-911M) (14 phr) (Total phr=115.56). The ingredients were added in the order listed with stirring and stirred at least 30 minutes at ambient temperature.

A plastic base (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side then top coated on the same side at a topcoat oven temperature of 180° F. to give a 0.55 g/msi (g/1000 in$^2$) target coat weight at 125 feet per minute, using an 85 Reverse Direct Quad Gravure, and 15% top coating. The resulting coated plastic film showed an isopropyl alcohol (IPA) resistance rating of 2.2 after aging 5 days at ambient temperature (0=no effect, 1=lightly scratched, 2=some whitening, 3=some rubbed off, 4=50% rubbed off, and 5=100% rubbed off. Haze after aging the film for 3 weeks at ambient temperature then boiling in water for ten minutes was measured at 2.4% following the procedure of ASTM D1003. Crosshatch Ink Adhesion immediately after printing with Black UV Screen Ink on coated film aged at 125° F. for 3 days showed good adhesion (99%) after three tape pulls.

EXAMPLE 9
(Epoxy Acrylate, Methyl Ether of Hydroquinone Stabilizer for Epoxy Acrylate, Polyfunctional Aziridine Cross-linking Agent)

The coating formulation of Example 8 was revised by decreasing particulate concentration, and increasing crosslinker concentration and coating weight to improve IPA resistance, while adding more epoxy acrylate to retain good ink adhesion.

A coating composition was prepared by combining 6465 g of anionic acrylic polymer (NeoCryl XK-90 resin) with 10913 g of water, dilute ammonium hydroxide in an amount to adjust the pH to 8.0, 87 g of MA1006 (dispersed at 5% solids) (0.15 parts per hundred based on XK-90), 29 g of methyl ether of hydroquinone (MEHQ), 1% in water (0.01 phr), 40.73 g of cross-linking agent (NeoRez CX100) (1.40 phr), 465.5 g of epoxy acrylate (DA-911M) (16 phr) and (Total phr=121.56). The ingredients were added in the order listed with stirring and stirred at least 30 minutes at ambient temperature.

A plastic base film (196 mils thick OPP with 2.3% by weight of a coextruded EP copolymer skin with 4.5% ethylene on the printable side and no primer layer, and with 2.9% by weight of an EP copolymer skin with 2% ethylene compounded with 2000 parts per million Syloblock 48 on the side opposite the printable side (adhesive side)) was corona treated on the printable side then top coated on the same side at a topcoat oven temperature of 180° F. to give a 0.80 g/msi (g/1000 in$^2$) target coat weight at 125 feet per minute, using an 85 reverse direct Quad Gravure, and 19% top coating. The resulting coated plastic film showed an excellent isopropyl alcohol (IPA) resistance rating of 1.3 after aging 5 days at ambient temperature (0=no effect, 1=lightly scratched, 2=some whitening, 3=some rubbed off, 4=50% rubbed off, and 5=100% rubbed off). Haze after aging the coated film for three weeks at ambient temperature then boiling in water for ten minutes was measured as 1.9% following the procedure of ASTM D1003. Crosshatch Ink Adhesion immediately after printing with Black UV Screen Ink on coated film aged at 125° F. for 3 days showed excellent adhesion (99%) after three tape pulls.

While the invention has been described as to what are presently believed to be the preferred embodiments of the invention, those skilled in the art will realize the various changes and modifications which can be made to the invention without departing from the spirit of such invention. All such changes and modifications will fall within the scope of the present invention and are therefore intended to be claimed.

It is claimed:

1. A printable plastic film, comprising:
   i) a plastic substrate layer;
   ii) a printable coating composition layer which comprises:
      a) an anionic acrylic polymer;
      b) epoxy acrylate in an amount sufficient to improve ink adhesion in said coating compositions; and
      c) a cross-linking agent,
   wherein said cross-linking agent cross-links said anionic acrylic polymer to an extent sufficient to improve the resistance of said coating to isopropyl alcohol and/or hot water.

2. The plastic film of claim 1, wherein said anionic acrylic polymer is cross-linked by said cross-linking agent and exposure to at least room temperature.

3. The plastic film of claim 1, wherein said anionic acrylic polymer is an iminated polymer.

4. The plastic film of claim 1, wherein said cross-linking agent is selected from the group consisting of polyfunctional aziridine, epoxy silane, polyfunctional epoxy, polyvalent cation selected from the group of metal ions consisting of Zr, Zn, Ca, and Ti, acetoacetate, carbodiimide, urea formaldehyde, melanine formaldehyde and polyfunctional isocyanate.

5. The plastic film of claim 1, wherein said cross-linking agent is a polyfunctional aziridine.

6. The plastic film of claim 1, wherein said cross-linking agent is selected from the group consisting of epoxy silane, polyfunctional epoxy, urea formaldehyde, melanine formaldehyde.

7. The plastic film of claim 6, wherein said cross-linking agent is added with a cross-linking catalyzing amount of a catalyst.

8. The plastic film of claim 7, wherein said catalyst is selected from the group consisting of imidazole, tertiary amine and p-toluene sulfonic acid.

9. The plastic film of claim 1, wherein said coating has dispersed therein a particulate or combination of different particulates.

10. The plastic film of claim 1, which further comprises a primer layer between said substrate layer and said coating composition layer.

11. The plastic film of claim 1, which has a dry coating weight of at least 0.1 grams/1000 in$^2$; and an ink print image on the side of said coating opposite from said plastic substrate layer.

12. The plastic film of claim 1, wherein said epoxy acrylate is the reaction product of an ether containing a three member oxirane ring of a member selected from the group consisting of phenols, bisphenols, ring substituted bisphenols, resorcinol, hydroquinone, adipic acid, phthalic acid, hexahydrophthalic acid, 2-hydroxy-3-chloropropyl acrylate, allyl alcohol, phenol, 1,6-hexanediol, glycerol, phenol formaldehyde novolac resins, polyethylene glycol, polypropylene glycol, ethylene glycol, propylene glycol, 1–4 butanediol, 1–6 hexanediol glycerol, glycol, lower alkyl substituted hydantoin and mixtures thereof; and an unsaturated acid selected from the group consisting of acrylic acid and methacrylic acid, diacrylic acid, dimethylacrylic acid, triacrylic acid and trimethylacrylic acid.

13. The plastic film of claim 1, wherein said epoxy acrylate is the reaction-product of a glycidyl ether of a member selected from the group consisting of polyethylene glycol and polypropylene glycol; and an unsaturated acid selected from the group consisting of acrylic acid and methacrylic acid.

14. The plastic film of claim 1, wherein said epoxy acrylate is stabilized by the incorporation of a stabilizer selected from the group consisting of methyl ether of hydroquinone, and hydroquinone.

15. The plastic film of claim 1, wherein:
said plastic substrate layer comprises one or more film-forming thermoplastic materials selected from the group consisting of polyolefins, polyamides, and polyesters;
said anionic acrylic polymer is an iminated polymer;
said epoxy acrylate Is the reaction product of an ether containing a three member oxirane ring of a member selected from the group consisting of phenols, bisphenols, ring substituted bisphenols, resorcinol, hydroquinone, adipic acid, phthalic acid, hexahydrophthalic acid, 2-hydroxy-3-chloropropyl acrylate, allyl alcohol, phenol, 1,6-hexanediol, glycerol, phenol formaldehyde novolac resins, polyethylene glycol, polypropylene glycol, ethylene glycol, propylene glycol, 1–4 butanediol, 1–6 hexanediol glycerol, glycol, lower alkyl substituted hydantoin and mixtures thereof; and an unsaturated acid selected from the group consisting of acrylic acid and methacrylic acid, diacrylic acid, dimethylacrylic acid, triacrylic acid and trimethylacrylic acid; and
said cross-linking agent is selected from the group consisting of polyfunctional aziridine, epoxy silane, polyfunctional epoxy, polyvalent cation selected from the group of metal ions consisting of Zr, Zn, Ca, and Ti, acetoacetate, carbodiimide, urea formaldehyde, melamine formaldehyde and polyfunctional isocyanate.

16. The plastic film of claim 17, wherein:
said printable coating composition layer comprises the combination of (1) said crosslinked anionic acrylic copolymer, which has been cross-linked by said cross-linking agent to an extent sufficient to improve the resistance of said coating to isopropyl alcohol and/or hot water and (2) reactive acrylic double bonds provided by the presence of said epoxy acrylate in an amount sufficient to improve ink adhesion.

17. A printable coating composition for plastic film, which comprises:
a) an anionic acrylic polymer;
b) epoxy acrylate in an amount sufficient to improve ink adhesion in said coating composition; and
c) a cross-linking agent,
wherein said cross-linking agent cross-links said anionic acrylic polymer to an extent sufficient to improve the resistance of said coating to isopropyl alcohol and/or hot water.

18. The coating composition of claim 17, wherein said anionic acrylic polymer is cross-linked by said cross-linking agent and exposure to at least room temperature.

19. The coating composition of claim 17, wherein said anionic acrylic polymer is an iminated polymer.

20. The coating composition of claim 17, wherein said cross-linking agent is selected from the group consisting of polyfunctional aziridine, epoxy silane, polyfunctional epoxy, polyvalent cation selected from the group of metal ions consisting of Zr, Zn, Ca, and Ti, acetoacetate, carbodiimide, urea formaldehyde, melamine formaldehyde and polyfunctional isocyanate.

21. The coating composition of claim 17, wherein said epoxy acrylate is the reaction product of:
1) a glycidyl ether of a member selected from the group consisting of phenols, bisphenols, ring substituted bisphenols, resorcinol, hydroquinone, phenol formaldehyde novolac resins, propylene glycol, polypropylene glycol, ethylene glycol, polyethylene glycol, 1–4 butanediol, 1–6 hexanediol glycerol, glycol, lower alkyl substituted hydantoin and mixtures thereof; and
2) an unsaturated acid selected from the group consisting of acrylic acid and methacrylic acid, diacrylic acid, dimethylacrylic acid, triacrylic acid and trimethylacrylic acid.

22. The printable coating composition of claim 17, wherein:
said anionic acrylic polymer is an iminated polymer;
said epoxy acrylate is the reaction product of an ether containing a three member oxirane ring of a member selected from the group consisting of phenols, bisphenols, ring substituted bisphenols, resorcinol, hydroquinone, adipic acid, phthalic acid, hexahydrophthalic acid, 2-hydroxy-3-chloropropyl acrylate, allyl alcohol, phenol, 1,6-hexanediol, glycerol, phenol formaldehyde novolac resins, polyethylene glycol, polypropylene glycol, ethylene glycol, propylene glycol, 1–4 butanediol, 1–6 hexanediol glycerol, glycol, lower alkyl substituted hydantoin and mixtures thereof; and an unsaturated acid selected from the group consisting of acrylic acid and methacrylic acid, diacrylic acid, dimethylacrylic acid, triacrylic acid and trimethylacrylic acid; and
said cross-linking agent is selected from the group consisting of polyfunctional aziridine, epoxy silane, polyfunctional epoxy, polyvalent cation selected from the group of metal ions consisting of Zr, Zn, Ca, and Ti, acetoacetate, carbodiimide, urea formaldehyde, melamine formaldehyde ad polyfunctional isocyanate.

23. The printable coating composition of claim 17, wherein:

said printable coating composition comprises the combination of (1) said crosslinked anionic acrylic copolymer which has been cross-linked by said cross-linking agent to an extent sufficient to improve the resistance of said coating to isopropyl alcohol and/or hot water and (2) reactive acrylic double bonds provided by the presence of said epoxy acrylate in an amount sufficient to improve ink adhesion.

24. A label, comprising a printable plastic film containing:
  i) a plastic substrate layer having two sides;
  ii) a printable coating composition layer on one side of said plastic substrate layer, whose outer surface is printed, which coating composition comprises:
    a) an anionic acrylic polymer;
    b) epoxy acrylate in an amount sufficient to improve ink adhesion in said coating composition;
    c) a cross-linking agent for said anionic acrylic polymer; and
  iii) a optional adhesive layer on the other side of said plastic substrate layer.

25. The label of claim 24, wherein:

said plastic substrate layer comprises one or more film-forming thermoplastic materials selected from the group consisting of polyolefins, polyamides, and polyesters;

said anionic acrylic polymer is an iminated polymer;

said epoxy acrylate is the reaction product of an ether containing a three member oxirane ring of a member selected from the group consisting of phenols, bisphenols, ring substituted bisphenols, resorcinol, hydroquinone, adipic acid, phthalic acid, hexahydrophthalic acid, 2-hydroxy-3-chloropropyl acrylate, allyl alcohol, phenol, 1,6-hexanediol, glycerol, phenol formaldehyde novolac resins, polyethylene glycol, polypropylene glycol, ethylene glycol, propylene glycol, 1–4 butanediol, 1–6 hexanediol glycerol, glycol, lower alkyl substituted hydantoin and mixtures thereof; and an unsaturated acid selected from the group consisting of acrylic acid and methacrylic acid, diacrylic acid, dimethylacrylic acid, triacrylic acid and trimethylacrylic acid; and said cross-linking agent is selected from the group consisting of polyfunctional aziridine, epoxy silane, polyfunctional epoxy, polyvalent cation selected from the group of metal ions consisting of Zr, Zn, Ca, and Ti, acetoacetate, carbodiimide, urea formaldehyde, melamine formaldehyde and polyfunctional isocyanate.

26. The label of claim 24, wherein:

said printable coating composition layer comprises the combination of (1) said crosslinked anionic acrylic copolymer, which has been cross-linked by said cross-linking agent to an extent sufficient to improve the resistance of said coating to isopropyl alcohol and/or hot water and (2) reactive acrylic double bonds provided by the presence of said epoxy acrylate in an amount sufficient to improve ink adhesion.

* * * * *